United States Patent [19]

Kia

[11] Patent Number: 5,089,206

[45] Date of Patent: Feb. 18, 1992

[54] DUAL CHARGE COMPRESSION MOLDING METHOD

[75] Inventor: Hamid G. Kia, Utica, Mich.

[73] Assignee: General Motors Corporation, Detroit, Mich.

[21] Appl. No.: 525,006

[22] Filed: May 18, 1990

[51] Int. Cl.⁵ ............................................. B29C 43/14
[52] U.S. Cl. .................................. 264/255; 264/258; 264/259; 156/62.2; 156/242; 156/296
[58] Field of Search ............... 156/242, 245, 249, 276, 156/279, 288, 289, 293, 297, 298, 299; 264/135, 136, 137, 250, 255, 257, 258, 259, 260, 294, 319, 320, 324, 325, 327

[56] References Cited

U.S. PATENT DOCUMENTS

| | | | |
|---|---|---|---|
| 3,449,482 | 6/1969 | Mitchell et al. | 264/108 |
| 3,903,343 | 9/1975 | Pfaff | 264/255 |
| 4,051,290 | 9/1977 | Jutte et al. | 264/255 |
| 4,353,857 | 10/1982 | Ray et al. | 264/258 |
| 4,385,955 | 5/1983 | Doerfling et al. | 264/257 |
| 4,636,422 | 1/1987 | Harris et al. | 264/257 |
| 4,937,032 | 6/1990 | Krone et al. | 264/259 |

*Primary Examiner*—Jay H. Woo
*Assistant Examiner*—Jeremiah F. Durkin, II
*Attorney, Agent, or Firm*—Randy W. Tung

[57] ABSTRACT

A dual charge compression molding method in which a first charge of a plastic material that will at least constitute the reinforcing means, i.e., the ribs and/or bosses, is first placed in the mold and compressed, the mold is then opened and a second charge of the plastic material is placed in the mold to constitute the flat or panel portion of the panel part after compression. A plastic part having a perfect appearance surface without sink mark defects can be produced.

5 Claims, 1 Drawing Sheet

DUAL CHARGE COMPRESSION MOLDING METHOD

FIELD OF THE INVENTION

The present invention generally relates to a method of molding glass fiber reinforced plastic panels and more specifically, relates to a method of producing glass fiber reinforced plastic panels with integral ribs and bosses without the sink mark defects.

BACKGROUND OF THE INVENTION

Glass fiber reinforced plastics exhibit superior physical and mechanical properties over unreinforced plastics. As a result, they are widely used in the automotive industry to produce a wide variety of interior and exterior parts. One of the most frequently used glass fiber reinforced plastic systems is sheet molding compound (SMC). SMC is a material composed of reinforcing chopped glass fibers combined with a complex resin system formulated in an almost infinite number of ways. A typical formulation includes ingredients such as inorganic fillers, thickeners, curing agents, and internal mold release agent in addition to a carrier polyester resin and a shrinkage-control agent.

The flexibility in SMC formulation lends itself to a variety of end use properties for molded parts which are suitable for a wide spectrum of commercial applications. One major application is in the automotive industry for producing exterior body panels. For many years, SMC parts have been used in exterior body parts such as hoods, deck lids, and door panels. The application of SMC materials in automotive exterior body parts is sometimes limited by appearance problems caused by inadequate processing and product design. Some of these commonly observed appearance problems are sink marks over ribs and bosses, waviness of the surface, and surface porosity.

Some of these problems have been solved by either making a modification in the formulation or by adding an extra step in the processing of SMC parts. For instance, the use of a low profile agent, or shrinkage control agent, have been found to greatly improve the surface waviness on molded SMC panels. The process of molded coating by injecting a thin layer of specially formulated coating into an SMC mold immediately after the completion of the SMC cure cycle is a technique found to be effective in producing a surface free from porosity.

Although the utilization of the molded coating and the shrinkage control agent has reduced the extent of sink marks, traces of sink marks still exist on SMC panels having integral ribs and bosses. One way of solving this problem is to style and design surface contours such that the small traces of sink marks are concealed. However, for large flat horizontal panels such as hoods and deck lids which require numerous ribs to achieve the required stiffness, sink marks cannot always be concealed with design lines. As a result, in order to avoid sink marks in the manufacturing of many large horizontal parts, a design of two piece panels bonded together are frequently used. In a bonded two piece panel design, a flat panel having a perfect appearance surface is bonded by adhesives to a support panel having ribs for stiffness and bosses for mounting hardware. This is a very costly design in that not only two separate pieces of panels need to be molded in separate processes, but also one additional bonding step must be used to bond the two panels together. It is therefore more desirable to design a one piece panel having reinforcing means such as ribs and bosses on the back and a perfect appearance surface in the front that can be processed in one molding step.

It is, therefore, an object of the present invention to provide a method of producing chopped glass fiber reinforced plastic panels having integral ribs and bosses and an appearance surface without sink mark defects.

It is another object of the present invention to provide a method of producing glass fiber reinforced plastic panels having integral ribs and bosses and an appearance surface without sink marks defects in which a combination of chopped glass fibers and continuous glass fibers are used.

SUMMARY OF THE INVENTION

I discovered that the main cause of sink marks on the appearance side of plastic panels having integral reinforcing means such as ribs and bosses is the separation of resins and fibers as well as the misalignment of the fibers in the vicinity of the ribs and bosses. The solution to the problem of sink marks is, therefore, the elimination of this resin and fibers heterogeneity. My novel invention provides a new dual charge compression molding method in which a first charge of a plastic material that will at least constitute the reinforcing means, i.e., the ribs and/or bosses, is first placed in the mold and compressed, the mold is then opened and a second charge of the plastic material is placed in the mold to constitute the flat or panel portion of the panel part after compression.

Two important processing criteria should be fulfilled in my novel dual charge compression molding method. First, the first charge of plastic material must be in a quantity sufficient enough to fill all the ribs and bosses portion of the mold cavity such that all the ribs and bosses are completely filled after the first compression. In practice, I have noted that an indication of such complete fill is that a thin web of the plastic material is formed in-between and connecting all the ribs and bosses.

The second important criterion of my novel process is that the time of compression on the first charge of plastic material must be sufficiently short and the mold must be opened prior to the time that the first charge of plastic material is completely cured. This is important because there must be some residual unreacted monomers and oligomers left in the first charge after the compression that will chemically react with the second charge of plastic material to form a strong bond. In the event that the first charge is completely cured, a weak bond formed between the first charge and the second charge could result in a weak panel after completion of the molding cycle.

DESCRIPTION OF THE DRAWINGS

Other objects, features and advantages of the present invention will become apparent upon consideration of the specification and the appended drawings in which.

DETAILED DESCRIPTION OF THE PREFERRED EMBODIMENT

In accordance with a preferred practice of my invention, a method of producing glass fiber reinforced plastic panels having a perfect appearance surface without any sink mark defect can be carried out by the following operative steps.

First, a set of two matching mold members are provided of which one of the two opposing interior mold surfaces has cavities for ribs and bosses. The lower mold member having the rib cavity is then heated to 150° C. and treated with a mold release material. Approximately 1100 grams of an SMC material is placed in the mold and compressed to flow. The formulation for my polyester resin based SMC material is shown in Table I.

TABLE I

| Chemical Composition of SMC | |
|---|---|
| COMPONENT | WEIGHT % |
| Polyester resin (STYPOL ® 40-3941) | 16.9 |
| Low profile additive (NEULON ® A)) | 13.0 |
| Styrene Monomer | 2.6 |
| Filler (CaCo$_3$) | 65.0 |
| Thickener (Mg(OH)$_2$) | 1.5 |
| Mold Release (zinc stearate) | 0.7 |
| Initiator (t-butyl perbenzoate) | 0.3 |

The polyester used in this formulation (STYPOL ® 40-3941) is a product of Freeman Chemical Company. The low profile additive is a product of Union Carbide. The magnesium hydroxide was predispersed in a polyester carrier resin to 40% weight ratio by the manufacturer (Plasticolors Inc.), and designated as PLAS-TIGEL ® 9037. The Styrene monomer used was graded AR and produced by Baker. The resin was compounded with 27% by weight chopped glass fibers. The fibers were produced by Owens Corning Fiberglas and were 25 mm in length. The external mold release used in these experiments was FREKOTE ® produced by HYSOL Corporation. It is a silicone blend in a mixture of tri-chloro-tri-fluoro-ethane, tri-chloro-tri-fluoro-methane, and di-chloro-di-fluroo-methane. The low profile additive used, NEULON ® A, is a polyvinyl acetate of 40% solid in styrene monomer.

Figure 1:
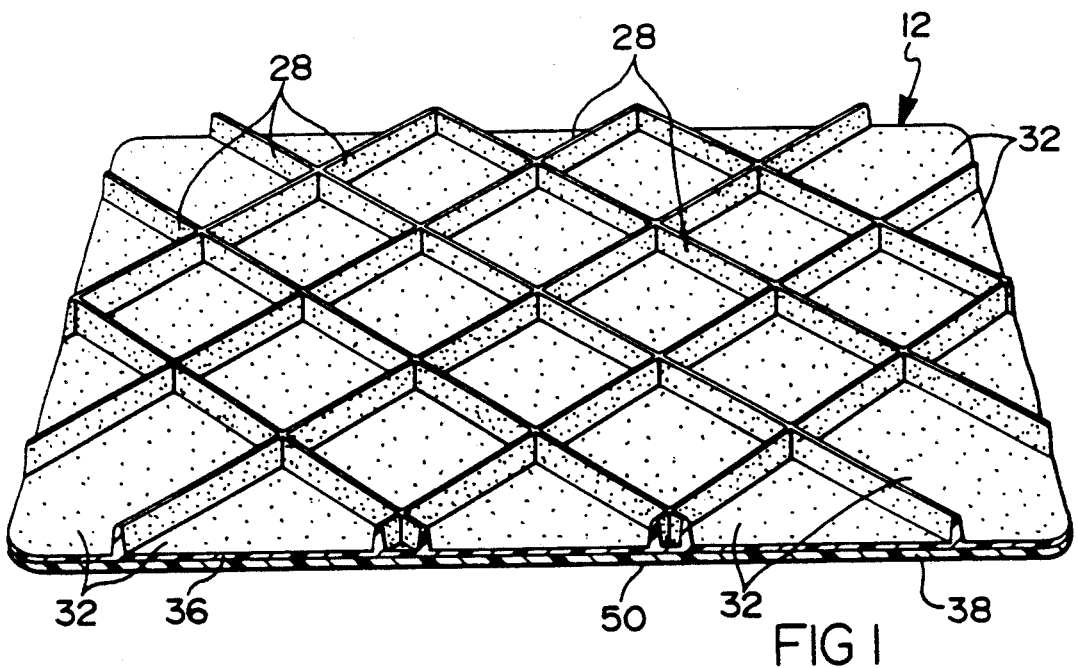
FIG. 1 is a perspective view of the rib side of a plastic panel having reinforcing ribs.

FIG. 1 is a perspective view of the rib side of a plastic panel 12 having integral reinforcing ribs 28.

Figure 2:
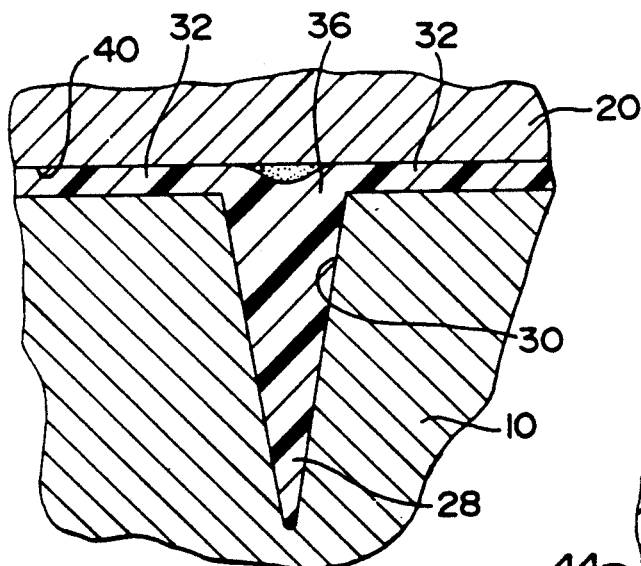
FIG. 2 is an enlarged cross-sectional view of a rib section after the first charge of plastic material is compression molded.

After the mold is closed for 10 to 20 seconds, the mold is opened to expose a partially cured polyester resin paste that is easily released from the upper mold member. I have found that in order to have good adhesion between the two layers, i.e., between the first charge and the second charge of SMC material, the first charge should preferably have a short mold closing time such that the first charge plastic material is not completely cured before it comes in contact with the second charge of plastic material As shown in FIG. 2, after the compression of the first charge plastic material 36, the rib portion 30 of the cavity is completely filled after compression between the upper mold member 20 and the lower mold member 10. The complete filling of rib portion 30 is normally indicated by the formation of a web section 32 in-between and connecting rib 28 with other ribs (not shown). The compression pressure used in making the first charge plastic material flow and filling the rib portion 30 of the cavity is at least sufficient to flow the plastic material. I have found that depending upon the viscosity of the resin paste, a pressure in the range between 250 to 1500 psi is sufficient.

Figure 3:
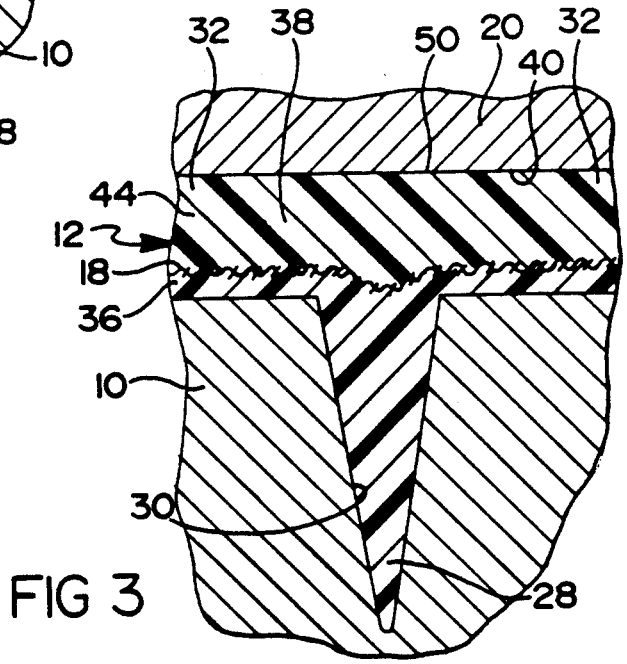
FIG. 3 is an enlarged cross-sectional view of a rib section after the second charge of plastic material is compression molded.

After the first charge is partially cured and the mold is opened, the second charge is placed in the mold on top of the first charge and the upper mold member is again closed onto the lower mold member to compress and form the plastic panel. This is shown in FIG. 3. Plastic panel 12 is completely formed after the second charge of plastic material 38 is compressed between upper mold 20 and lower mold 10 to fill the panel portion of the cavity 44 and forming an appearance surface 50 by the upper mold surface 40. The second charge of plastic material is cured for approximately 60 seconds for a complete cure before the mold is opened and the ribbed panel is removed.

In one alternate embodiment, I have used a flexible sheet member such as a rubber sheet of ¼ inch thickness bonded to the interior mold surface of the upper mold member during molding of the first charge of plastic material. The purpose of the flexible sheeting member was to avoid damaging the appearance side of the mold and to insulate the upper mold member and thus minimizing the heating and curing of the first charge of plastic material.

In another embodiment of my invention, I have added a glass veil layer to the top of the first charge before closing the upper mold member. This glass veil layer made of continuous glass fibers facilitates the release of the resin paste of the first charge at the end of the first charge molding step. This glass veil is shown as 18 in FIG. 3.

I have discovered that a suitable mold closing time for the first charge plastic material is between 10-100 seconds depending on the thickness of the first charge and the temperature of the upper mold member. I have also discovered that in order to form a satisfactory bond between the first charge and the second charge plastic materials, it is desirable to have approximately 1-5 percent of the active ingredients remaining active on the surface of the first charge plastic material such that the active ingredients will chemically bond the molecules to the active molecules on the surface of the second charge plastic material. The degree of cure on the surface of the first charge plastic material can be determined by using established chemical analysis techniques such as the thermal analysis by using a differential scanning calorimeter.

Other types of glass fiber reinforced plastic materials such as glass fiber reinforced thermoplastics or other non-polyester based thermosets may work equally well in my novel dual charge compression molding technique.

While my invention has been described in terms of a preferred embodiment and two alternate embodiments thereof, it is to be appreciated that those skilled in the art will readily apply these teachings to other possible variations of the invention.

The embodiments of the invention in which an exclusive property or privilege is claimed are defined as follows:

1. A dual charge compression molding method for making glass fiber reinforced plastic parts having a first surface being an appearance surface and a second surface containing integral reinforcing means comprising the steps of:

providing a set of matched mold members each having an interior mold surface defining a mold cavity having a reinforcing portion and a panel portion contained therein when the two mold members are closed together, loading a quantity of a first charge of glass fiber filled plastic material into said mold cavity sufficient to fill substantially the reinforcing portion of said mold cavity, compressing said mold members together under a pressure sufficient to fill substantially all the reinforcing portion of the mold cavity, opening said mold members before said first charge of plastic material is substantially cured, loading a second charge of glass fiber filled plastic material on top of said first charge of plastic material sufficient to fill said panel portion of said mold cavity, closing said mold members nd compress under sufficient pressure, and opening said mold members and demold said molded plastic part.

2. A dual charge compression molding method for making glass fiber reinforced plastic parts having a first surface being an appearance surface and a second surface containing integral reinforcing means comprising the steps of:

providing a set of matched mold members each having an interior mold surface defining a mold cavity having a reinforcing portion and a panel portion contained therein when the two mold members are closed together, loading a quantity of a first charge of sheet molding compound material into said mold cavity sufficient to fill substantially the reinforcing portion of said mold cavity, compressing said mold members together under a pressure sufficient to fill substantially all the reinforcing portion of the mold cavity, opening said mold members before said first charge of sheet molding compound is substantially cured, loading a second charge of sheet molding compound material on top of said first charge of sheet molding compound material sufficient to fill said panel portion of said mold cavity, closing said mold members and compress under sufficient pressure, and opening said mold members and demold said molded plastic part.

3. In the method of claim 1, said reinforcing means further comprising reinforcing ribs.

4. In the method of claim 1, said reinforcing means further comprising reinforcing bosses.

5. In the method of claim 1, said reinforcing means further comprising reinforcing ribs and bosses.

* * * * *